US008164830B2

(12) United States Patent  
Astill

(10) Patent No.: US 8,164,830 B2  
(45) Date of Patent: Apr. 24, 2012

(54) SCREEN ASSEMBLY FOR SIMULATOR

(76) Inventor: Todd M. Astill, Salt Lake City, UT (US)

( * ) Notice: Subject to any disclaimer, the term of this patent is extended or adjusted under 35 U.S.C. 154(b) by 0 days.

(21) Appl. No.: 13/242,835

(22) Filed: Sep. 23, 2011

(65) Prior Publication Data

US 2012/0075697 A1  Mar. 29, 2012

Related U.S. Application Data

(60) Provisional application No. 61/385,809, filed on Sep. 23, 2010.

(51) Int. Cl.  
*G03B 21/56* (2006.01)  
*G03B 21/60* (2006.01)

(52) U.S. Cl. ......... 359/443; 359/449; 359/461; 160/241

(58) Field of Classification Search .................. 359/461, 359/443, 449; 160/241  
See application file for complete search history.

(56) References Cited

U.S. PATENT DOCUMENTS

| | | | | | |
|---|---|---|---|---|---|
| 862,644 | A | * | 8/1907 | Kepler | 160/89 |
| 3,655,203 | A | * | 4/1972 | Gretzky | 359/443 |
| 4,923,258 | A | * | 5/1990 | Styles | 312/115 |
| 4,962,420 | A | * | 10/1990 | Judenich | 359/443 |
| 6,011,504 | A | * | 1/2000 | Tan | 342/4 |
| 6,209,614 | B1 | * | 4/2001 | Smoot | 160/237 |
| 7,740,022 | B2 | * | 6/2010 | Li | 135/87 |
| 2005/0045284 | A1 | * | 3/2005 | Ullyett | 160/238 |
| 2009/0236050 | A1 | * | 9/2009 | Marzilli | 160/241 |
| 2010/0186908 | A1 | * | 7/2010 | Meadows et al. | 160/242 |

* cited by examiner

*Primary Examiner* — Christopher Mahoney  
(74) *Attorney, Agent, or Firm* — Morriss O'Bryant Compagni, PC

(57) ABSTRACT

A screen assembly for a projectile-based simulator is comprised of front, right and left fabric panels that form a hitting bay with a front projector impact screen. Each fabric panel can be raised and lowered with respective roller assemblies that operate unison so that the fabric panels are simultaneously raised and lowered. Zippers are provided between each of the fabric panels that are configured to cause adjacent fabric panels to engage as the panels are lowered and to disengage as the panels are raised to allow the panels to wind upon respective roller assemblies.

20 Claims, 14 Drawing Sheets

SCREEN ASSEMBLY FOR SIMULATOR

CROSS-REFERENCE TO RELATED APPLICATION

The present invention claims priority to U.S. Provisional Patent Application Ser. No. 61/385,809 filed on Sep. 23, 2010, the entirety of which is incorporated by this reference.

FIELD OF THE INVENTION

The present invention relates generally to motorized video screens, and more specifically, to motorized video screens used in conjunction with simulators, such as a golf simulator.

STATE OF THE RELATED ART

Retractable projection screens have been available for decades. They are comprised of a fabric panel having a white projection surface on one side. The fabric panel has are upper end coupled to a roller contained within a housing. The roller may be biased so as to allow the screen to be rolled onto the roller when retracted into the housing. Motorized screens are similarly configured but include an electric motor that can be activated to raise or lower the screen as desired. Such motorized screens are mainly employed for home theater applications or other situations where the user prefers that the screen be at least somewhat hidden from view when not in use. In such applications, the screen housing may be at least partially concealed in the ceiling so that the screen can be fully retracted from view.

Golf simulators for home use have become increasingly more popular as the price of such systems has become more affordable to the average person. A golf simulator typically includes a front screen for receiving a projected image of a golf scene. The screen, commonly referred to as an impact screen, is capable of also being hit into with actual golf balls without being damaged. The impact screen is spaced from any adjacent wall so that the screen can deflect to some extent to absorb the impact of a golf ball without the ball and screen making contact with the wall that could cause the ball to ricochet. Because of the necessity to anchor the base of the impact screen to prevent it from moving during use when a golf ball is to impact the screen, the impact screen is fully anchored at all points relative to the surrounding room.

In addition, errant golf shots that are hit beyond the sides of the impact screen can cause damage to surrounds, especially when the golf simulator is installed in a room in a home, such as a family room. To prevent such damage, some golf simulators have been provided with side netting that is placed from the sides of the screen toward the hitting area to collect such errant shots. When netting is positioned adjacent the screen at its sides, there is a potential for golf balls to exit between the screen and the net. Moreover, such netting systems must either be manually taken down or, if left in place, are not aesthetically attractive in a home environment.

As such, there is a need in the art to provide a screen system for a golf simulator that can be easily retracted when not in use, includes side impact screens to prevent errant shots from being contained and that prevents golf balls from exiting between the impact screen and the side screens.

The advantages and characterizing features will become apparent from the following description of certain illustrative embodiments of the invention. The features and advantages of the present invention are set forth or will become more fully apparent in the detailed description that follows. Furthermore, the features and advantages of the present invention may be learned by the practice of the invention and will become apparent to one skilled in the art upon review of the description, as set forth hereinafter.

SUMMARY OF THE INVENTION

Accordingly, the present invention is directed to a retractable screen assembly for a projectile-based simulator, such as a golf simulator where real golf balls can be hit into the retractable screen assembly that includes a front screen assembly comprised of a first rectangular fabric panel having first and second longitudinal sides and a first roller assembly configured to raise and lower the first fabric panel. A first side screen assembly is comprised of a second rectangular fabric panel having first and second sides with the first side thereof proximate the first longitudinal side of the first fabric panel. The second fabric panel is oriented at a right angle relative to the first fabric panel, and a second roller assembly configured to raise and lower the second fabric panel. A second side screen assembly is comprised of a third rectangular fabric panel having first and second sides with a second side thereof proximate the second longitudinal side of the first fabric panel. The third fabric panel is also oriented at a right angle relative to the first fabric panel. A third roller assembly is configured to raise and lower the third fabric panel.

A first elongate fastening device is attached to and between the first longitudinal side of the first fabric panel and an adjacent first side of the second fabric panel. A second elongate fasting device is attached to and between the second longitudinal side of the first fabric panel and an adjacent second side of the third fabric panel. A motor is coupled to at least one of the front, first side and second side screen assemblies to simultaneously raise and lower the first, second and third fabric panels. Raising of the first, second and third fabric panels causes the first and second elongate fastening devices to separate proximate first and second ends of the first roller assembly to allow the first, second and third fabric panels to wind upon the respective first, second and third roller assemblies. Lowering the first, second and third fabric panels causes the first and second elongate fastening devices to engage along their length to interconnect the first, second and third fabric panels.

In one embodiment, a first gear assembly is coupled between the first roller assembly and the second roller assembly and a second gear assembly is coupled between the first roller assembly and the third roller assembly. The first and second gear assemblies cause the first, second and third panels to raise and lower in unison.

In another embodiment, the motor is coupled to at least one of the first and second gear assemblies to drive at least one of the first and second gear assemblies in a first direction to raise the first, second and third panels and in a second direction to lower the first, second and third panels.

In yet another embodiment, the first and second elongate fasting devices comprise zippers with the zippers each having a first side attached to one of the second and third fabric panels and a second side attached to the first fabric panel.

In still another embodiment, each of the first and second sides of each elongate fastener are fixedly attached to one another at a first end so as to prevent a zipper pull of each elongate fastener from moving past the first end.

In yet another embodiment, the zipper pull of each of the first and second elongate fasteners is held proximate the first roller assembly so that as the first, second and third panels are lowered, the zipper pull of each of the first and second elongate fasteners causes teeth of the respective zipper to engage along its length and as the first, second and third panels are lowered, the zipper pull of each of the first and second elongate fasteners causes teeth of the respective zipper to disengage along its length to separate the first, second and third panels above the zipper to allow the first, second and third panels to wind upon a respective roller assembly.

In another embodiment, a lower frame assembly is comprised of a first elongate member coupled to a lower end of the first fabric panel, a second elongate member coupled to a lower end of the second fabric panel and a third elongate member coupled to a lower end of the third fabric panel. The first, second and third elongate members have adjacent ends that are coupled to one another.

In yet another embodiment, the lower frame assembly is configured to weight the lower ends of the first, second and third fabric panels.

In another embodiment, the first, second and third fabric panels are each provided with a lower pocket for receiving a respective elongate member of the lower frame assembly.

In still another embodiment, the first, second and third fabric panels form a generally rectangular golf ball hitting bay.

In yet another embodiment, the right and left fabric panels are comprised of a netting material.

BRIEF DESCRIPTION OF THE DRAWINGS

The following drawings illustrate exemplary embodiments for carrying out the invention. Like reference numerals refer to like parts in different views or embodiments of the present invention in the drawings. Those of ordinary skill in the art will realize that the following description of the present invention is illustrative only and not in any way limiting. Other embodiments of the invention will readily suggest themselves to such skilled persons.

DETAILED DESCRIPTION OF THE ILLUSTRATED EMBODIMENTS

Figure 1:
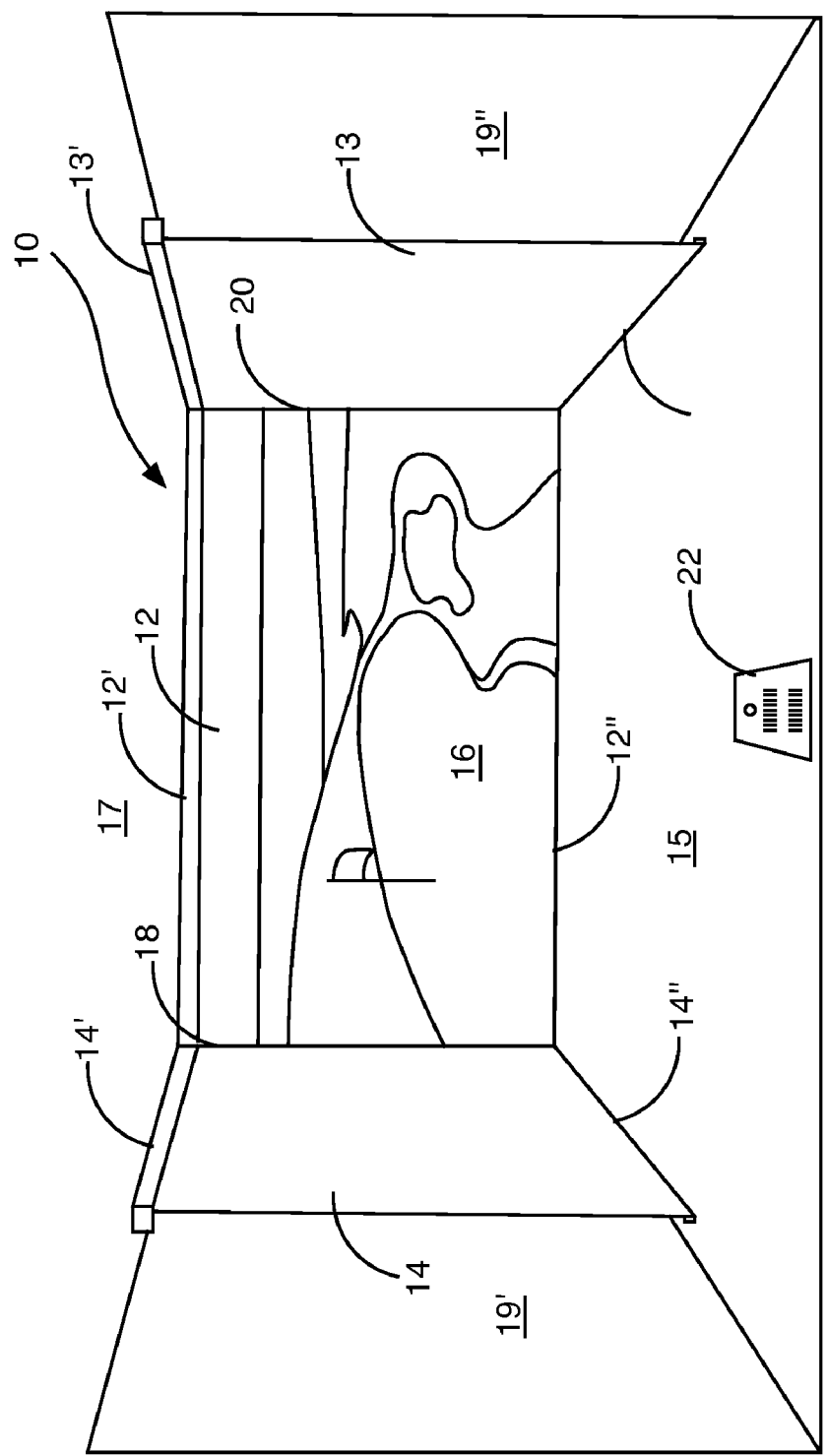
FIG. 1 is a front perspective view of a golf simulator screen assembly in accordance with the principles of the present invention.

FIG. 1 illustrates a first embodiment of a screen assembly, generally indicated at 10, in accordance with the principles of the present invention. The screen assembly 10 is comprised of three screens 12, 13 and 14. The screens 12, 13 and 14 are configured, when fully extended to extend from floor 15 to ceiling 17 as illustrated. The front screen 12 is provided to perform two functions. The first function is to absorb the impact of a projectile, such as a golf ball, tennis ball, baseball, hockey puck, etc. being hit against it to prevent the projectile from impacting the wall (not visible) behind the screen 12 or other structures that may be behind the screen 12. Thus, the front screen 12 must be formed from a material that is capable of being repeatedly impacted by a projectile without being damaged. Secondly, the front screen provides a reflective surface, such as a white screen for use as a projector screen so as to display a golf scene 16 as illustrated. The side screens 13 and 14 are provided to prevent a projectile, such as a golf ball, being hit toward or ricocheting from the front screen 12 from impacting walls 19' and 19" or other structures behind the screens 13 and 14.

The three screens 12, 13 and 14 are supported by overhead screen housings 12', 13' and 14', respectively, that are configured to be mounted to the ceiling 17 or other overhead structure and for retaining the screens 12, 13 and 14 as they are retracted into the housings 12', 13' and 14' when stowed. At the two intersecting corners 18 and 20 where the screens 12, 13 and 14 meet, the screens 12, 13 and 14 are held together along substantially the entire length thereof. This is important so as to prevent a projectile, such as a golf ball, hit from the hitting mat 22 that impacts the screens 12, 13 and 14 at or near one of the corners 18 or 20 is not allowed to pass between the screens 12, 13 and 14. The screens 12, 13 and 14 are formed from fabric panels. As previously mentioned, for the front screen 12, the material has a white projection surface for projecting a projected image from an overhead or rear projector and is formed from canvas, woven mesh or other materials known in the art. The side screens 13 and 14 may be formed from similar material, but it is more desirable to form such side panel from a black material so as to reduce reflected light on the front screen 12 so as to form masking around the screen 12. In addition, the side screens may be formed from a netting fabric or other similar materials known in the art.

A lower frame assembly 21 is coupled to the lower ends 12", 13", 14" of the screens 12, 13 and 14. The lower frame 21 provides weight to the lower ends 12", 13" and 14" of the screens 12, 13 and 14 and stabilizes the lower ends so as to substantially match the configuration of the housings 12', 13' and 14'. When the screens 12, 13 and 14 are fully lowered, the frame 21 rests upon the floor 15. In this position, the lower frame 21 prevents projectiles, such as a golf ball, from passing between the lower ends 12", 13" and 14" of the screens 12, 13 and 14 and the floor 15.

Figure 2:
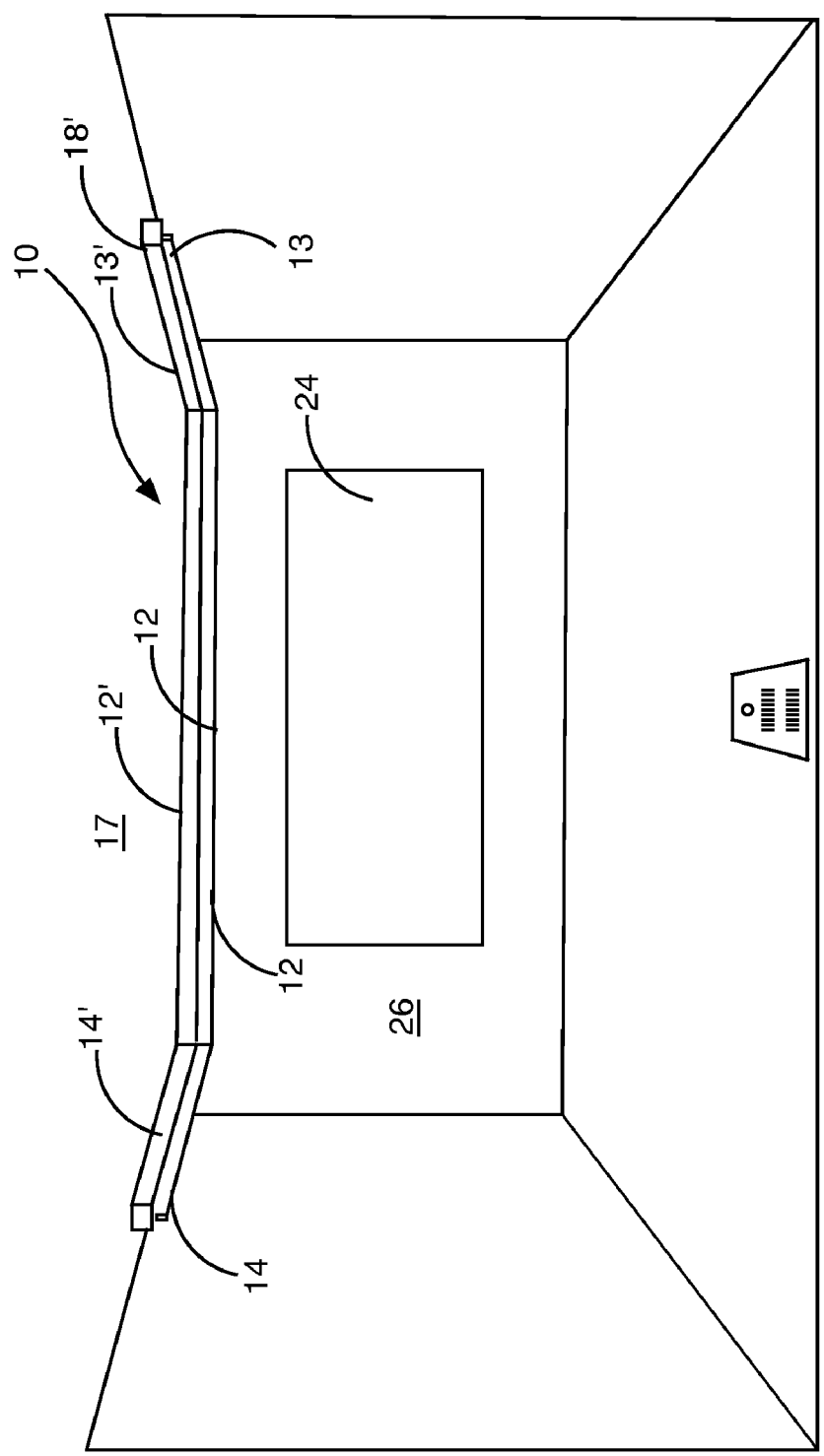
FIG. 2 is a front perspective view of a golf simulator screen assembly in a retracted position in accordance with the principles of the present invention.

As illustrated in FIG. 2, the screens 12, 13 and 14 are configured to substantially fully retract into their respective screen housings 12', 13' and 14'. This feature allows the screens to be moved out of the way so that the room in which the screen assembly 10 is installed can be used for other purposes, such as a home theater having a projector screen 24 installed on the back wall 26. While shown as being exposed for illustration purposes, each of the screen housings 12', 13' and 14' may be mounted in screen recesses that are provided in the ceiling 17 of the room in which the screen assembly 10 is installed. The screens 12, 13 and 14 can be retracted until the frame 21 abuts against the respective roller assemblies of the screens 12, 13 and 14.

Figure 3:
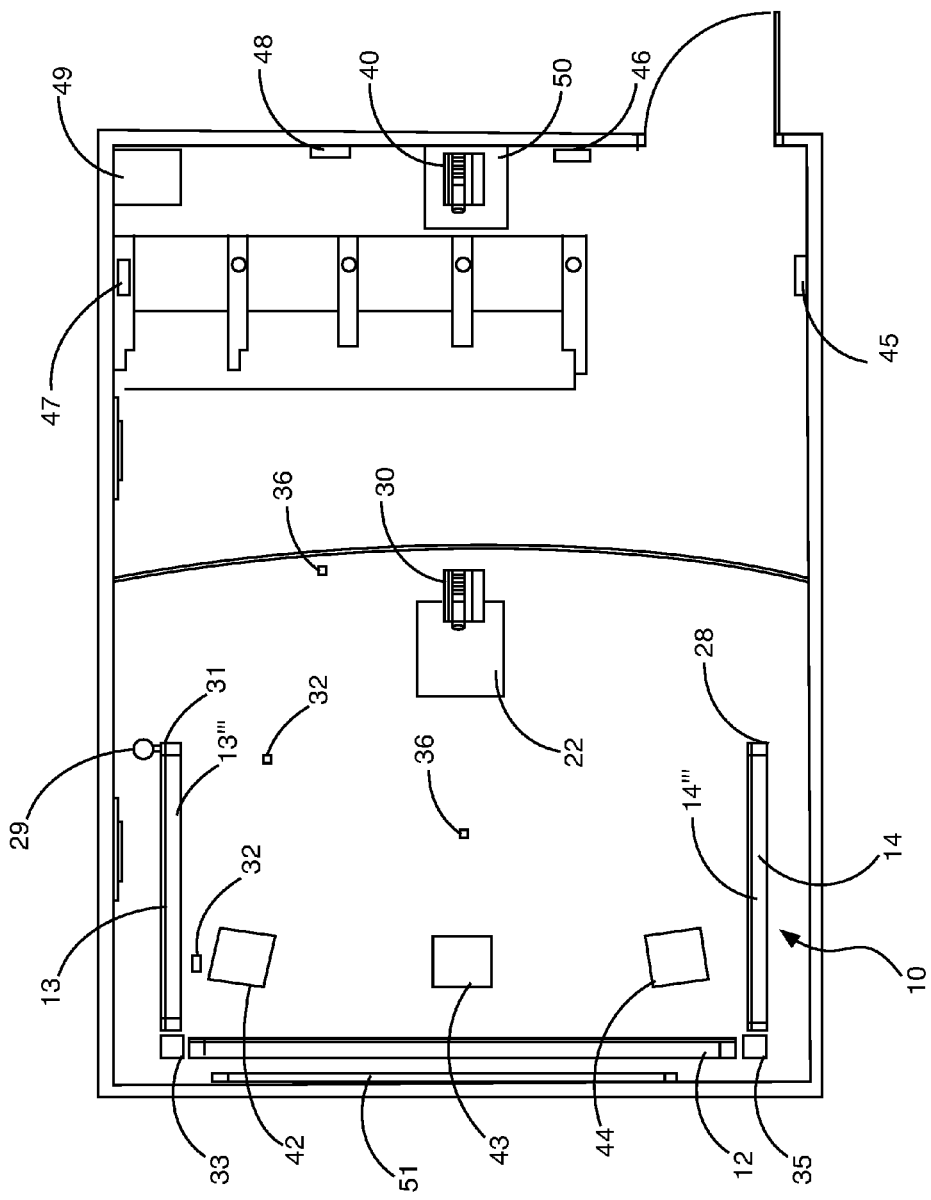
FIG. 3 is a top plan view of a golf simulator system in accordance with the principles of the present invention.

FIG. 3 illustrates an overhead view of a three screen assembly 10 installed within a room equipped with equipment to function as both a home theater and a golf simulator. The screens 12, 13 and 14 are mounted within screen recess 28 that forms a U or C-shaped channel in the ceiling. This allows the screens to be fully retracted so as to be less, if not completely, concealed from view when retracted. Movement of the screens, either up or down, is controlled by the roller motor 29 that is also installed in the ceiling. The roller motor is coupled to the end 31 of the roller assembly 13'''. While each roller assembly 12''', 13''' and 14''' is spaced from each other at the corners, gear assemblies 33 and 35 couple adjacent roller assemblies at their proximal ends. As the motor 29 turns the roller assembly 13''', gear assemblies 33 and 35 cause simultaneous movement of the roller assemblies 12''' and 14'''. As will be more fully described herein, the movement of the screens is thus synchronized so that the screens 12, 13 and 14 move in sync.

The golf simulator may include a golf projector 30 for projecting a golf simulation video on the screen 12, an electronic hitting mat 22 that provides feedback in the form of data corresponding to the swinging of a golf club, and various floor and ceiling microphones 32, 34 and 36. The home theater may include furniture 38, a video projector 40 for move viewing on the screen 51, a plurality of speakers 42-49, an equipment rack 50 for housing various audio and video equipment and computer hardware for operating the golf simulator and a projector screen 51. Some of the equipment can be used for both the home theater and the golf simulator. For example, the audio equipment could be used for the home theater as well as providing sound for the golf simulator, and while two projectors are shown, the same projector 30 could be used for both golf simulation and movie viewing.

Figure 4:
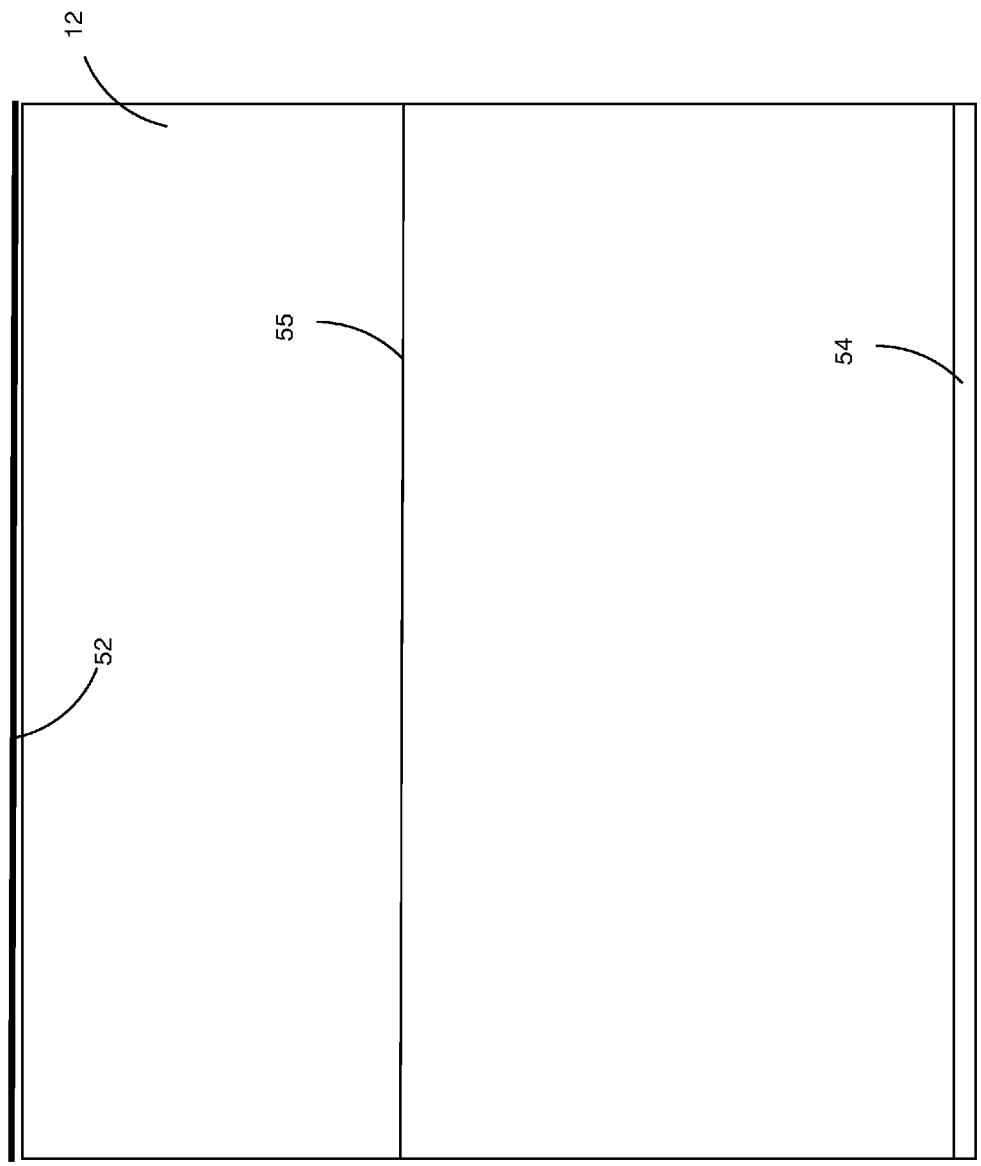
FIG. 4 is a front view of a front impact screen in accordance with the principles of the present invention.
Figure 5:
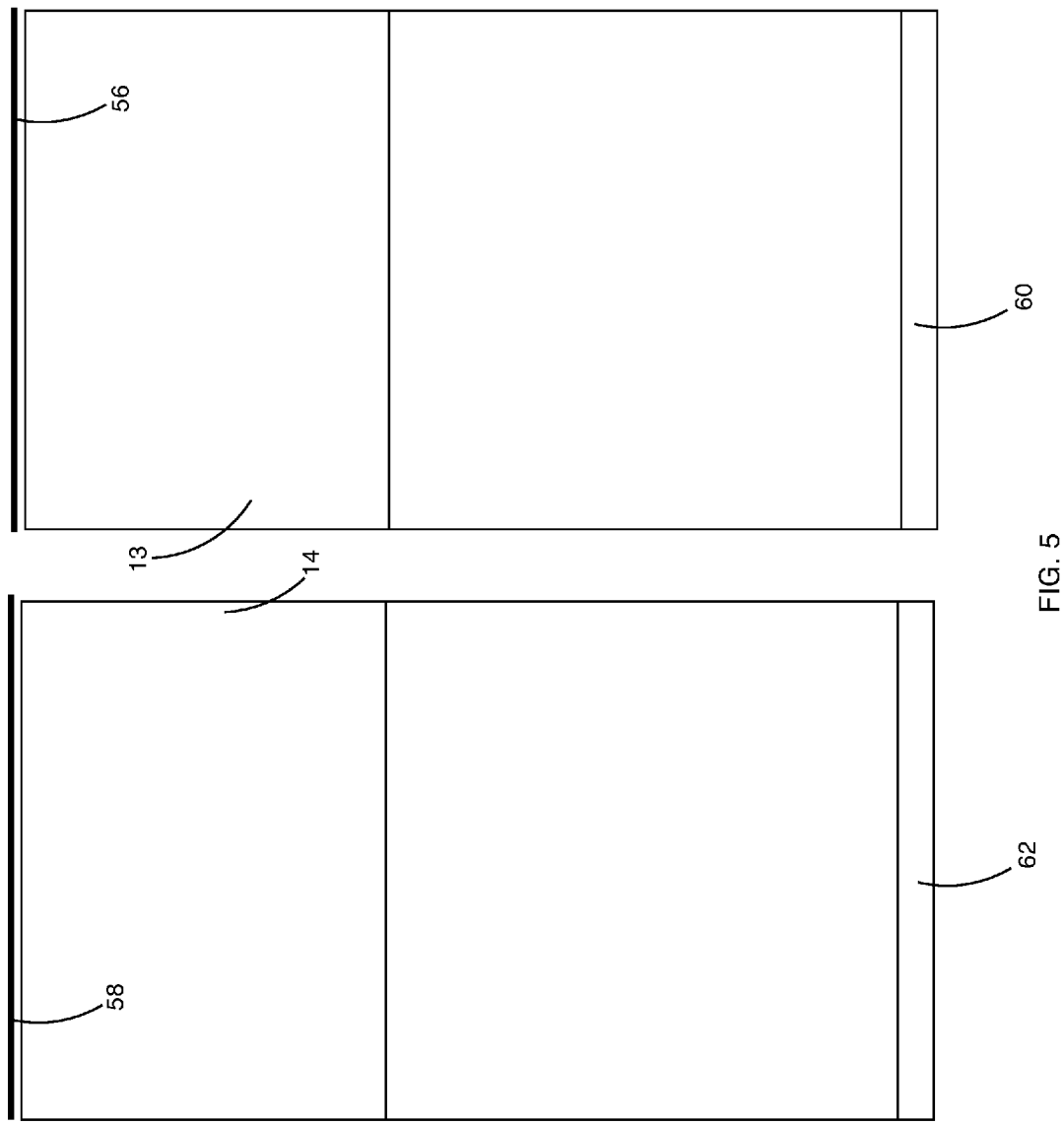
FIG. 5 is a front view of left and right side screens in accordance with the principles of the present invention.

As illustrated in FIG. 4, the front screen 12 is comprised of a rectangular sheet of material having a spline 52 at the top and a bottom edge pocket 54. The spline 52 may be approximately thirteen feet wide and the pocket 54 may be approximately three inches wide and extend substantially the entire length of the bottom edge of the screen 12. The screen 12 may have a height of approximately 145 inches and a width of approximately 155 inches. Because of the size of the screen 12, it may be necessary to form the screen from more than one piece of fabric that is joined by a seam 55. The overall dimensions of the screen 12, however, may be modified to fit the size of a particular installation. For example, the width and height may be increased for a larger room or decreased for a smaller room. Of course, a requirement for height of the room and thus the screen 12 for the golf simulator to be installed may be to ensure that a golf club can be swung without impacting the ceiling. Likewise, as shown in FIG. 5, the right and left screens 13 and 14, respectively, are configured similarly to the screen 12 with splines 56 and 58 attached to the top of each screen 13 and 14 as well as bottom edge pockets 60 and 62. The width of the side screens 13 and 14, however, are about half of the width of the front screen 12. The side screens 13 and 14 provide side protection from golf balls that may be hit offline that would otherwise miss the front screen 12 when hit toward the front screen 12. The splines 52, 56 and 58 of the screens is used to attach the screens to their respective roller assembly so that the screens can be properly wound and unwound from their respective roller.

Figure 6:
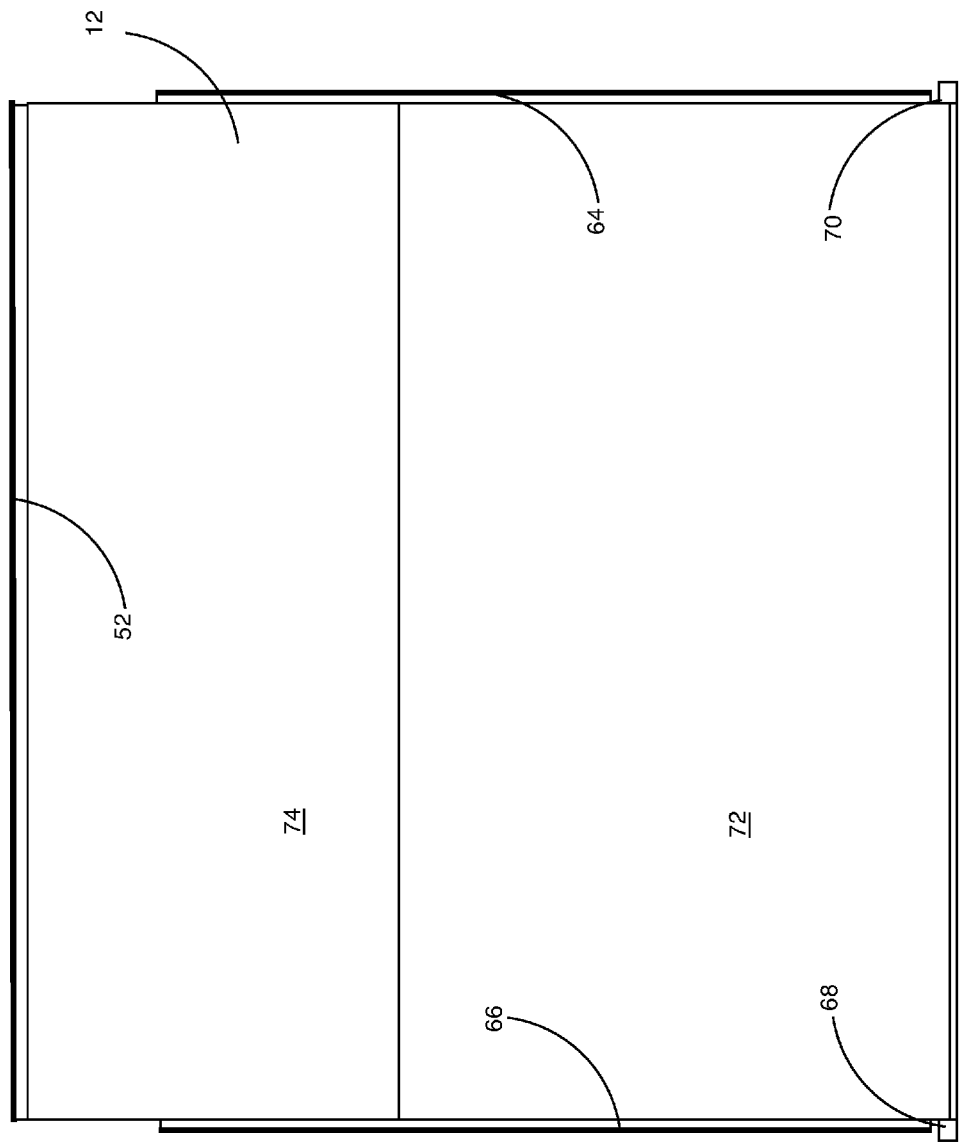
FIG. 6 is a back view of an impact screen in accordance with the principles of the present invention.
Figure 7:
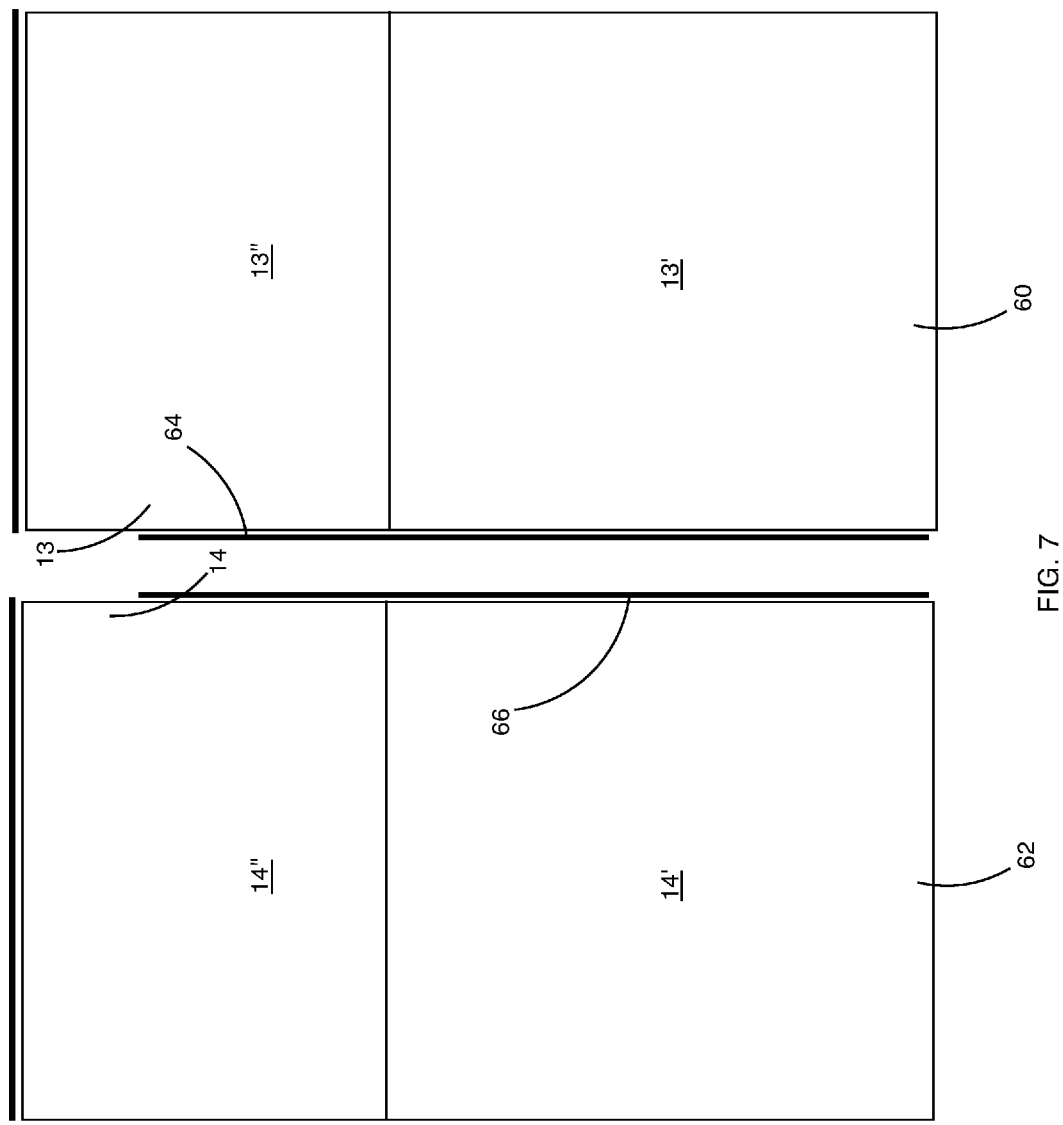
FIG. 7 is a back view of left and right side screens in accordance with the principles of the present invention.

As illustrated in FIG. 6 and FIG. 7, the screens 12, 13 and 14 are provided with and interconnected by a pair of zippers 64 and 66 with half of the zipper 64 attached to the right side edge of the screen 12 and the other mating half of the zipper 64 attached to the left side edge of the screen 13. Similarly, half of the zipper 66 is attached to the left side edge of the screen 12 with the mating half of the zipper 66 attached to the right side of the screen 14. The longitudinal position of each zipper segment of the zippers 64 and 66 are such that the screens 12, 13 and 14 will align in height so that the bottom of each screen 12, 13 and 14 will be aligned when raised or lowered. The tops of the zippers 64 and 66 are spaced from the spline 52 to allow the upper portion of the screen to be at least partially wound upon the roller for the screen 12 and to position the tops of the zippers 64 and 66 near the roller when the screen is fully extended. The screen 12 is provided with tabs 68 and 70 that are welded to the back of the screen as by thermal bonding or by an adhesive bond. The bottom edges of the side screens 13 and 14 are welded to prevent fraying of the screen material.

The front screen 12 is provided with a white viewable portion 72 and a black portion 74 that is positioned above the white portion 72. The white portion is provided to be of a width and height ratio to match the size ratio of a projected image. For example, the white portion 72 may have a width to height ratio of 16 to 9. This is a standard aspect ratio for many high definition projectors. The side screens 13 and 14, however, are completely black. As such, each of the black portions of the screens provide masking around the white portion 72 of the front screen 12 that enhances the video image and limits external and reflected light that would otherwise reflect on the white portion 72 of the screen thereby diminishing the image quality of the picture.

The front screen 12 and side screens 13 and 14 are each configured with two layers of two different screen materials. For example, the white portion 72 of the screen is formed from a different material than the black portion 74 that extends above and behind the white portion 72. The dual layer nature of the screens 12, 13 and 14 has three principal purposes. First, providing a dual layer impact screen specifically for the front screen 12 is more capable of absorbing the impact from a projectile, such as a golf ball without damage to either layer. Secondly, by configuring the backing layer 74 to be slightly more narrow than the front layer 72 (e.g., one inch more narrow), the front layer with the zipper attached rolls with the same thickness across the drum or roller so that the screen 12 will properly roll on the drum or roller. Thirdly, the front layer 72 that is used for reflecting a project image and for being impacted by a projectile is necessarily an open weave material that allows some light to pass through. The black backing layer 74 absorbs the light that passes through the front layer 72 and maintains the contrast of the image that would otherwise be diminished without the black backing layer 74 due to the light passing through the front screen.

In order for all of the screens 12, 13 and 14 to maintain the same thickness around the roller upon which the screens 12, 13 and 14 are wound when the screens 12, 13 and 14 are retracted, each of the side screens 13 and 14 are provided with dual layers 13', 13" and 14', 14", respectively. Again, the dual layer configuration of the side screens 13 and 14 help to absorb impact of a golf ball or other projectile striking the screens 13 and 14 without damage to the screens. Also, for applications where the simulator is a golf simulator, the golf ball is most likely to strike the first seven feet of the screen, as measured from the floor. As such, the dual layer nature of the screens 12, 13 and 14 extends for about the first seven feet of each screen.

Figure 8:
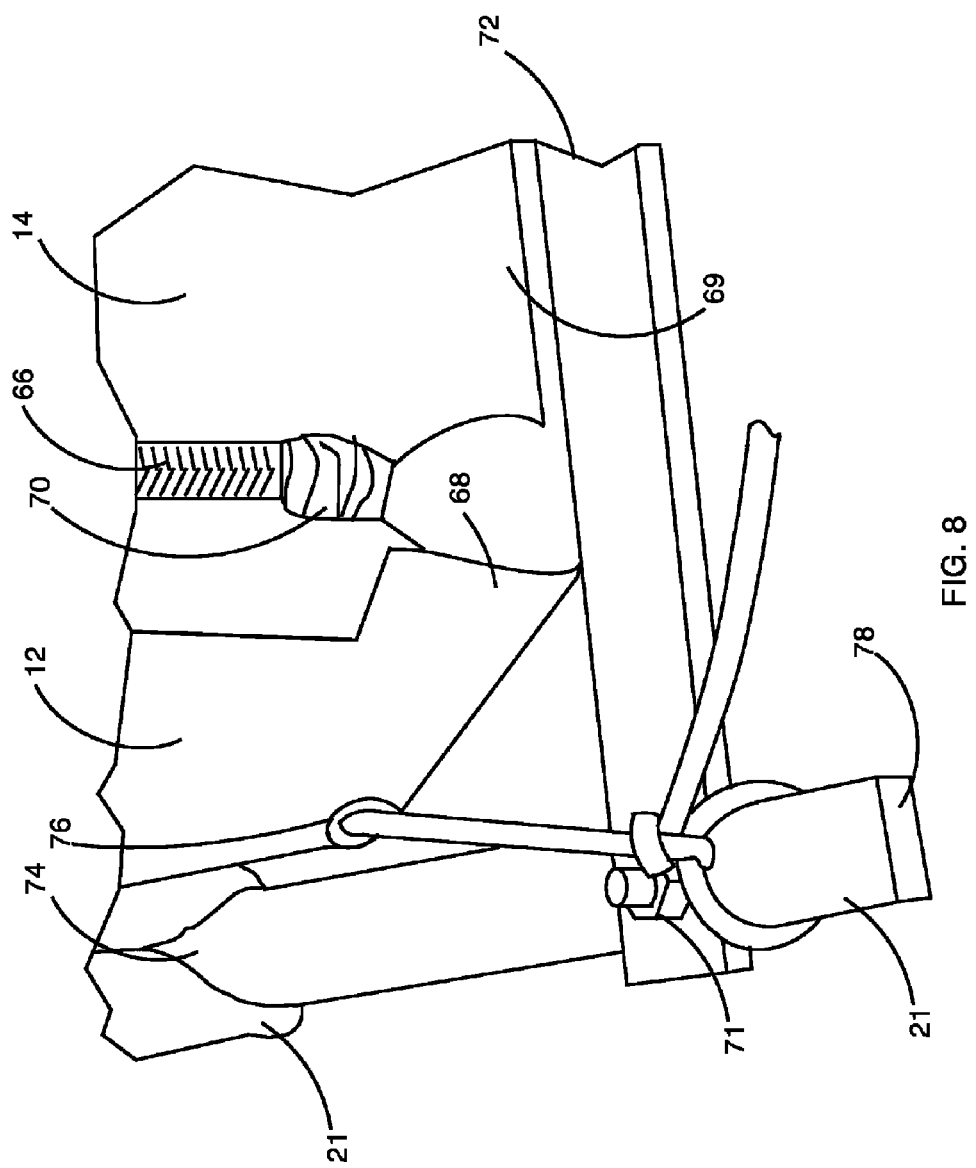
FIG. 8 is a perspective view of a bottom corner of a golf simulator screen assembly in accordance with the principles of the present invention.

As further shown in FIG. 8, the bottom corners of the front and left side screens 12 and 14 are illustrated. The zipper 66 interconnects the two screens 12 and 14 with the bottom of the zipper 66 including a stop 70 that prevents the zipper from completely separating when the screens 12 and 14 are retracted. Thus, even when the screens are fully retracted, the screens 12, 13 and 14 are joined together along the bottom edges thereof. The tab 68 of the front screen 12 provides a portion of the front screen that can be permanently attached to the bottom edge 69 of the screen 14 as by sewing, adhesive bonding or other means of temporary or more permanent attachment. As further illustrated in FIG. 8, a plurality of elongate members formed of weighted bars (72 and 74 of which are shown) are provided that are positioned a right angles and that extend behind and along the bottom edges of the screens 12, 13 and 14 to form a lower frame 21. The weighted bars are held in a perpendicular arrangement by being attached to one another as with a threaded fastener 71 as shown, by welding or other means known in the art. The weighted bars essentially form a C or U-shaped frame that is held within the pockets 75 provided at the bottom of each screen 12, 13 and 14. Thus, as the screens 12, 13 and 14 are raised and lowered, the weighted frame is also raised and lowered. Ideally, when the screens 12, 13 and 14 are lowered, they are lowered until the weighted frame 21 just touches the floor. That way, the screens 12, 13 and 14 are held in some tension to provide substantially flat screen surfaces without buckling of the screen fabric and to prevent projectiles, such as a golf ball, from passing between the floor and the screens 12, 13 and 14. Grommets 76 are attached through the bottom corners of the screen 12 through which a resilient cord 78, such as a bungee-type cord, passes and is attached to the frame 21. The cord 78 tensions the screen 12 to keep the screen 12 relatively flat and to provide a resilient and properly tensioned screen when impacted by a projectile, such as a golf ball. Similar attachments of the side screen 14 to the bar 72 are provided along the lower edge of the screen 14. As such, the weighted frame 21 maintains the side screen 14 in a perpendicular relationship to the front screen 12.

Figure 9:
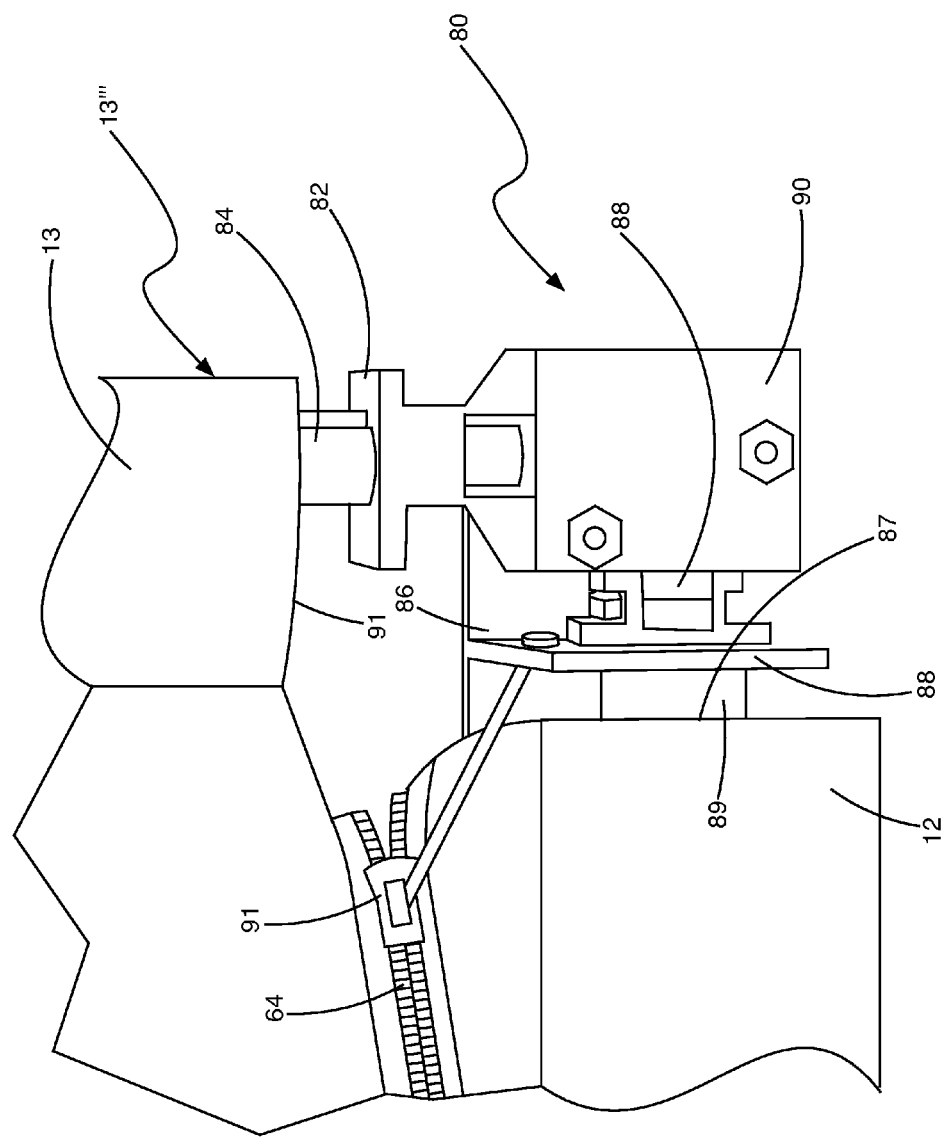
FIG. 9 is a perspective view of a top corner of a golf simulator screen assembly in accordance with the principles of the present invention.

Referring to FIG. 9, there is illustrated a gear box assembly, generally indicated at 80. The gear box 80 provides a geared interconnection between the front 12 and side screen 13 so that the two screens 12 and 13 move in unison, whether being extended or retracted. The gears may include worm gears or other gearing arrangements that allow for a ninety-degree change in drive direction between the two drive shafts of the gear box 80 that are coupled to the drums of the screens 12 and 13. On the output shaft 82, a spacer 84 is provided that keeps the proper distance between the screens for the zipper function. The spacer 84 is cut to length and slotted for removal without requiring removal of the drum or roller 85.

On the screen 12, the screen extends about an inch over the drum or roller 87 to provide adequate zipper overhang. A T-shaped mounting bracket 86 is configured to attach to a ceiling or overhead structure with the mounting bracket 86 extending downwardly to support the weight of the drums 85 and 87 and screens 12 and 13. A bearing assembly 88 is attached to the bracket 86. The shaft 89 of the drum 87 is held by the bearing assembly 88 that couples the roller 87 to the gear box 80. The bracket 86 carries the weight of the drum 87 and screen 12 and maintains the drum 87 the proper distance from the ceiling. A gearbox reinforcement plate 90 is also provided to add structural stability to the gearing assembly.

The zipper 64 includes a zipper pull 91 that is coupled to the bracket 86 or may be coupled to any other structure of either roller assembly 13''' or 12''', as with a wire or cord 93. This maintains the zipper pull 91 in relative position to the top of the screen assembly 10, i.e., near the ceiling, to allow the screens 12 and 13 to be wound upon their respective rollers 87 and 85 as they are raised and lowered. As the screens 12 and 13 are lowered, the zipper pull 91 causes the zipper 64 below the zipper pull 91 to zip together as shown. As the screens 12 and 13 are raised, the zipper pull is held to cause the zipper 64 to separate above the zipper pull 91 so that the screens 12 and 13 are separated prior to being wound upon their respective rollers 87 and 85.

Figure 10:
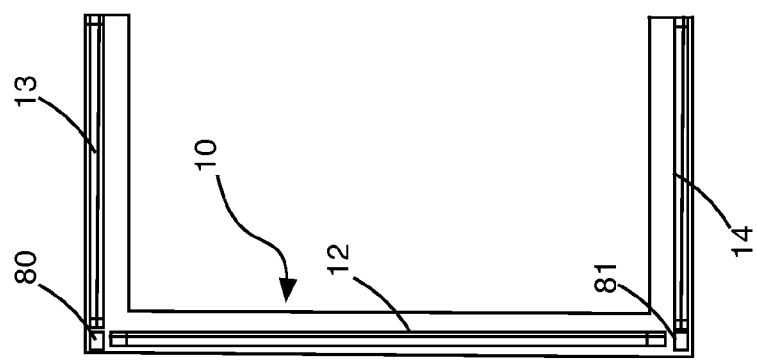
FIG. 10 is a bottom view of a golf simulator
Figure 11:
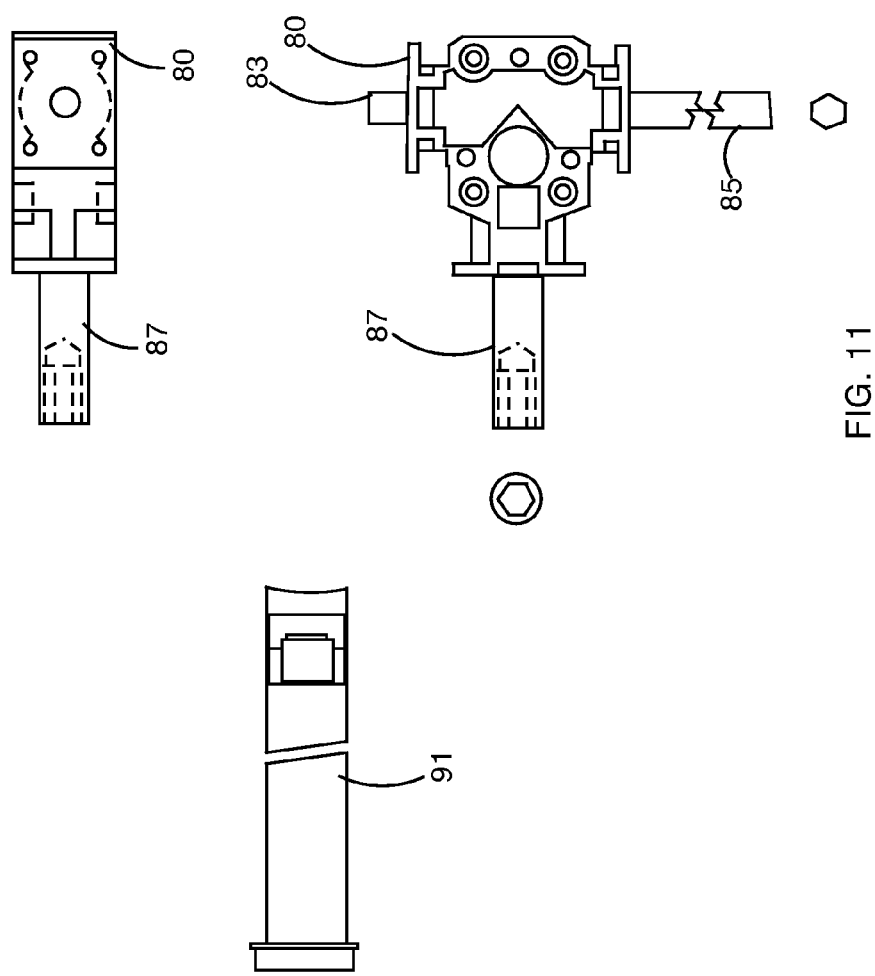
FIG. 11 is side and top views of a corner gear assembly and a screen motor in accordance with the principles of the present invention.

As shown in FIGS. 10 and 11, the screen assembly 10 includes two gearbox assemblies 80 and 81. The gearbox assemblies 80 and 81 synchronize the movement of the screens 12, 13 and 14 so that they are caused to extend and retract in unison. The driving gearbox 80 is configured with an input shaft 83 and a pair of output shafts 85 and 87. The input shaft 83 is configured for attachment to the output of the motor 91 and the output shafts 85 and 87, which are oriented perpendicularly to each other, are configured for attachment to one side of the roller of the front screen 12. The other gearbox 81 is similar in configuration, but does not have two output shafts. It is provided with a single input shaft that is coupled to the opposite end of the front screen roller and an output shaft that is coupled to the roller of the other side screen. A single motor 91 is provided to drive the gearbox 80 and thus to raise and lower all three screens 12, 13 and 14 in unison. The motor may be an LT50 Altus RTS, which has a standard AC motor that has a built-in radio control. The motor is capable of executing up, down and stop functions and can be programmed. Alternatively, the two bear boxes could be configured similarly to the gearbox 81 with an input shaft and an output shaft oriented perpendicularly to the input shaft. The motor 91 could be coupled to one end of one of the drums or rollers of the side screens 13 or 14 at an end opposite the gearbox.

Figure 13:
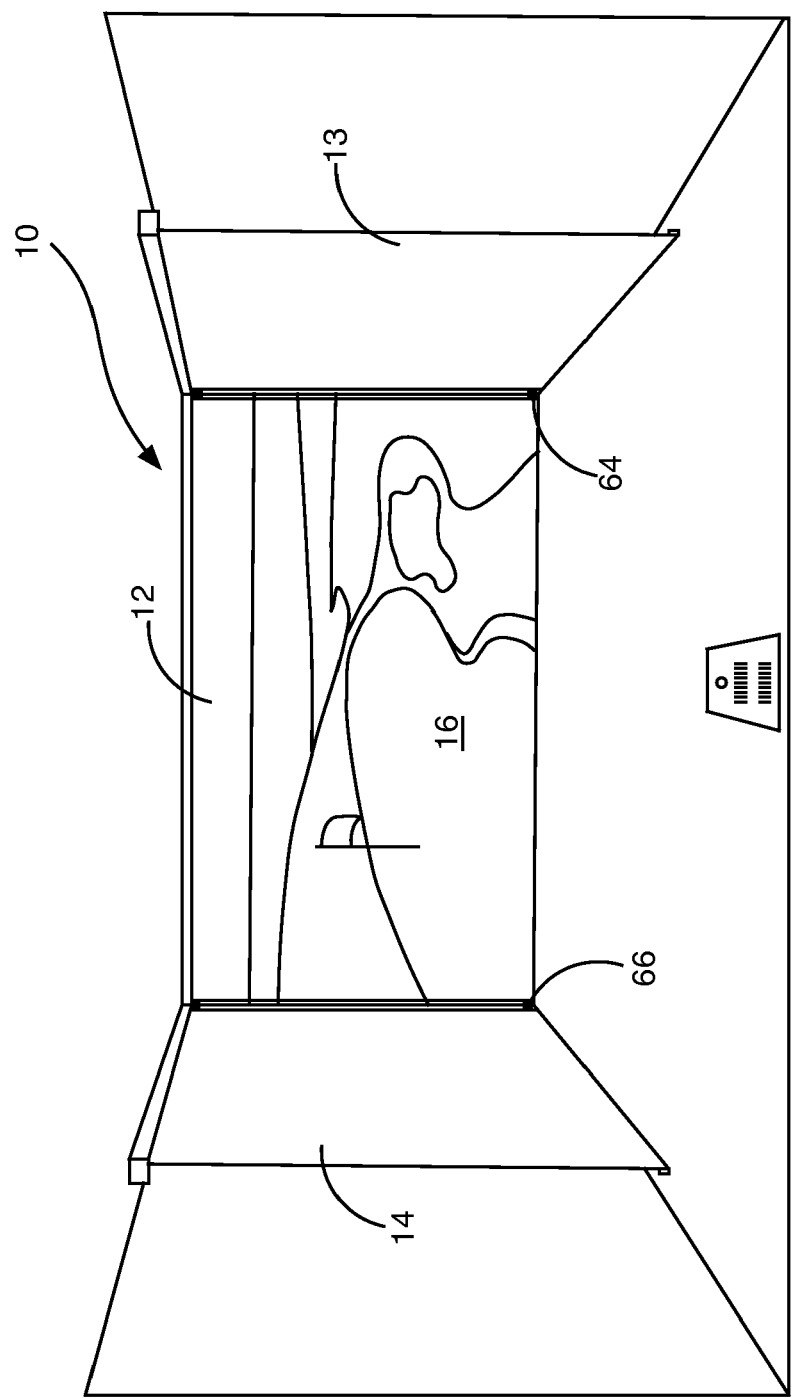
FIG. 13 is a front perspective view of a golf simulator screen assembly in accordance with the principles of the present invention.
Figure 14:
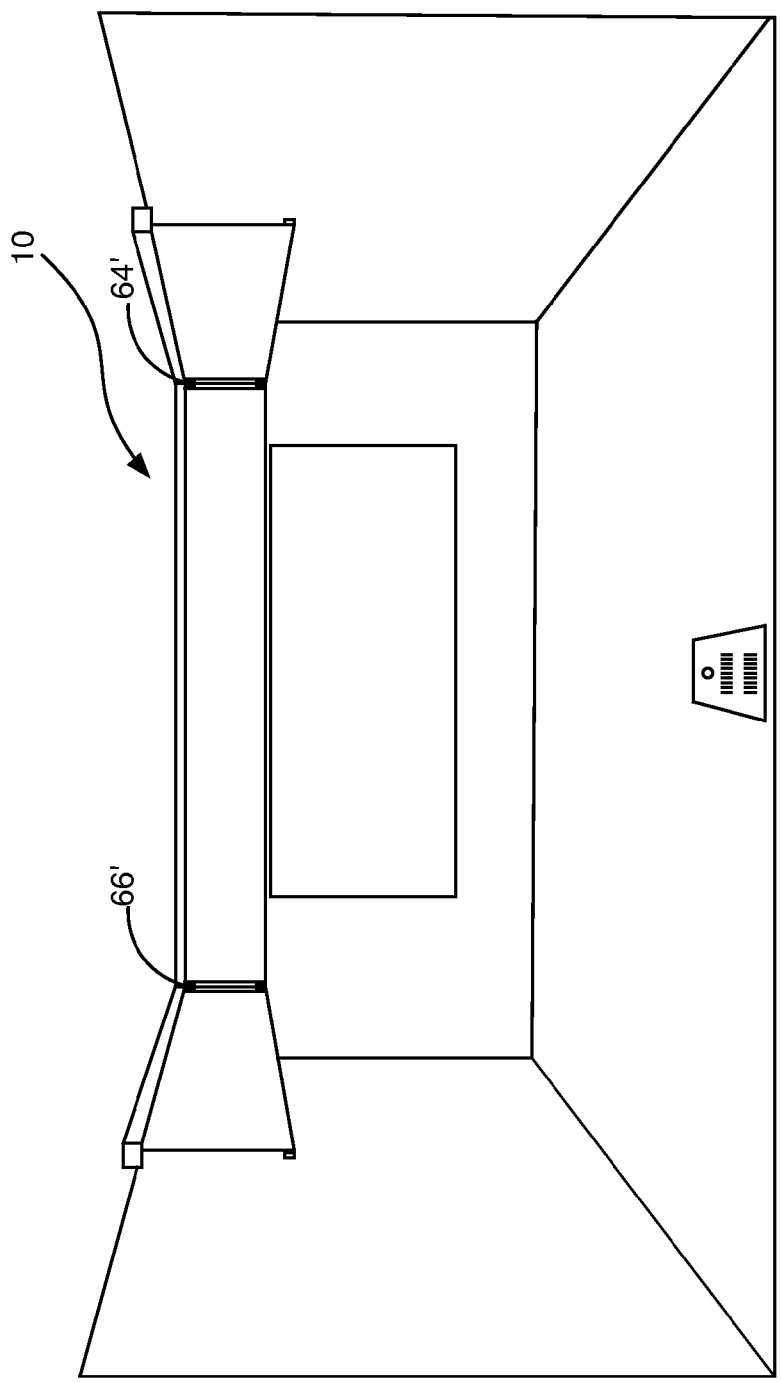
FIG. 14 is a front perspective view of a golf simulator screen assembly in a retracted position in accordance with the principles of the present invention.

At each of the longitudinal adjacent sides of the screens 12, 13 and 14, a zipper, such as zipper 92, is attached. The zipper 92 has a length sufficient to extend a substantial length of the respective side of the screens. As shown in FIG. 13, when the screens 12, 13 and 14 are fully extended, the zippers 64 and 66 extend from proximate the bottom edges of the screens 12, 13 and 14 at the adjacent corners to proximate the top edges thereof. The zippers thus provide a continuous seam at these corners to prevent a projectile, such as a golf ball, from passing between the screens. As further shown in FIG. 14, as the screens 12, 13 and 14 are retracted, the portions of the screens 12, 13 and 14 below the zipper pulls 64' and 66' are zipped together. Above, the pulls, however, the screens 12, 13 and 14 have been unzipped and rolled on their respective drums. Thus, the screens are automatically separated as they retract to allow each individual screen to be rolled on its respective drum. Each of the pulls 64' and 66' are secured relative to the ceiling or the drum assemblies of the screens with a resilient cord, such as a bungee-type cord 93.

Figure 12:
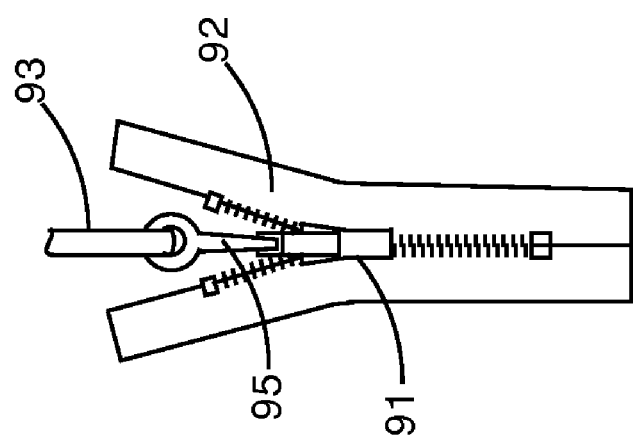
FIG. 12 is front view of a zipper in accordance with the principles of the present invention.

As shown in FIG. 12, the zipper 92 includes a zipper pull 91 to which a hook 95 is coupled between the elastically resilient cord 93 and the zipper pull 91. The hook 95 may have a weight limit so as to release the pull 91 in the case of a snag to prevent damage to the screen assembly 10. For example, the hook 95 may be configured to release the zipper pull 91 when 35 pounds of force or more is applied to the zipper pull 91. In such a case, the screens may continue to be lowered, but the zipper pull 91 will now move with the screens as it is no longer held relative to the ceiling or roller assemblies. As the screens are retracted, the zipper pull 91 maintains its position so as to cause the screens to unzip relative to one another as the individual screens are separated and rolled onto their respective screen drums. The screens 12, 13 and 14 are configured with an overhang, such as a one inch overhang, over the drum width for accommodating the zippers and welds to hang off of the roller, thus preventing bunching at the ends. Thus, the screens 12, 13 and 14 form a freestanding projection screen assembly that zips together as the screens descend from the ceiling and that separate as they ascend when retracted into the ceiling.

It will be apparent to those skilled in the art that some other configuration of a screen assembly, other uses of such a screen assembly or certain modifications can be employed in a manner consistent with the teachings of the present invention without departing from the inventive concepts herein. For example, such a zipping-type screen assembly according to the present invention and using various other mesh-type screen materials could be used to enclose an outdoor area, such as a patio or deck, for the purpose of keeping bugs and other things out. In such applications, the screen assembly could be enclosed with a mesh screen at times and open for others. In such an application, a zipper on the back edge of the side curtains could be provided to attach to a structure such as a home or other building to fully enclose the area.

Thus, while there have been described various embodiments of the present invention, those skilled in the art will recognize that other and further changes and modifications may be made thereto without department from the spirit of the invention, and it is intended to claim all such changes and codifications that fall within the true scope of the invention. It is also understood that, as used herein and in the appended claims, the singular forms "a," "an," and "the" include plural reference, unless the context clearly dictates otherwise.

Unless defined otherwise, all technical and scientific terms used herein have the same meanings as commonly understood by one of ordinary skill in the art to which this invention belongs. While various methods and structures of the present invention are described herein, any methods or structures similar or equivalent to those described herein may be used in the practice or testing of the present invention. All references cited herein are incorporated by reference in their entirety and for all purposes. In addition, while the foregoing advantages of the present invention are manifested in the illustrated embodiments of the invention, a variety of changes can be made to the configuration, design and construction of the invention to achieve those advantages including combinations of components of the various embodiments. Hence, reference herein to specific details of the structure and function of the present invention is by way of example only and not by way of limitation.

What is claimed is:

1. A screen assembly for a projectile-based simulator, comprising:
   a front screen assembly comprised of a first rectangular fabric panel having first and second longitudinal sides and a first roller assembly configured to raise and lower the first fabric panel;
   a first side screen assembly comprised of a second rectangular fabric panel having first and second sides with the first side thereof proximate the first longitudinal side of the first fabric panel, the second fabric panel oriented at an angle relative to the first fabric panel, and a second roller assembly configured to raise and lower the second fabric panel;
   a second side screen assembly comprised of a third rectangular fabric panel having first and second sides with a second side thereof proximate the second longitudinal side of the first fabric panel, the third fabric panel oriented at an angle relative to the first fabric panel, and a third roller assembly configured to raise and lower the third fabric panel;
   a first elongate fastening device attached to and between the first longitudinal side of the first fabric panel and an adjacent first side of the second fabric panel;
   a second elongate fasting device attached to and between the second longitudinal side of the first fabric panel and an adjacent second side of the third fabric panel; and
   a motor coupled to at least one of the front, first side and second side screen assemblies to simultaneously raise and lower the first, second and third fabric panels, wherein raising of the first, second and third fabric panels causes the first and second elongate fastening devices to separate proximate first and second ends of the first roller assembly to allow the first, second and third fabric panels to wind upon the respective first, second and third roller assemblies and lowering of the first, second and third fabric panels causes the first and second elongate fastening devices to engage along their length to interconnect the first, second and third fabric panels.

2. The screen assembly of claim 1, further comprising a first gear assembly coupled between the first roller assembly and the second roller assembly and a second gear assembly coupled between the first roller assembly and the third roller assembly, the first and second gear assemblies causing the first, second and third panels to raise and lower in unison.

3. The screen assembly of claim 2, wherein the motor is coupled to at least one of the first and second gear assemblies to drive at least one of the first and second gear assemblies in a first direction to raise the first, second and third panels and in a second direction to lower the first, second and third panels.

4. The screen assembly of claim 1, wherein the first and second elongate fasting devices each comprise a zipper, each zipper having a first side thereof attached to one of the second and third fabric panels and a second side thereof attached to the first fabric panel.

5. The screen assembly of claim 4, wherein each of the first and second sides of each elongate fastener are fixedly attached to one another at a first end thereof so as to prevent a zipper pull of each elongate fastener from moving past the first end.

6. The screen assembly of claim 5, wherein the zipper pull of each of the first and second elongate fasteners is held proximate the first roller assembly so that as the first, second and third panels are lowered, the zipper pull of each of the first and second elongate fasteners causes teeth of the respective zipper to engage along its length and as the first, second and third panels are lowered, the zipper pull of each of the first and second elongate fasteners causes teeth of the respective zipper to disengage along its length to separate the first, second and third panels above the zipper to allow the first, second and third panels to wind upon a respective roller assembly.

7. The screen assembly of claim 1, further comprising a lower frame assembly comprised of a first elongate member coupled to a lower end of the first fabric panel, a second elongate member coupled to a lower end of the second fabric panel and a third elongate member coupled to a lower end of the third fabric panel, the first, second and third elongate members having adjacent ends that are coupled to one another.

8. The screen assembly of claim 7, wherein the lower frame assembly is configured to weight the lower ends of the first, second and third fabric panels.

9. The screen assembly of claim 8, wherein the first, second and third fabric panels are each provided with a lower pocket for receiving a respective elongate member of the lower frame assembly.

10. The screen assembly of claim 1, wherein the first, second and third fabric panels form a generally rectangular golf ball hitting bay.

11. A screen assembly for a projectile-based simulator, comprising:
a front fabric panel forming an impact screen having a left longitudinal side and a right longitudinal side;
a right fabric panel having a first side positioned adjacent the right side of the front panel;
a left fabric panel having a first side positioned adjacent the left side of the front panel;
front, right and left roller assemblies configured for raising and lowering a respective one of the front, right and left fabric panels, the front, right and left roller assemblies configured to operate in unison so as to raise and lower the front, right and left fabric panels substantially simultaneously;
a first zipper coupled between the front fabric panel and the right fabric panel; a first end of the first zipper being fixedly coupled together to prevent separation of the second zipper at the first end and having a zipper pull configured to be held relative to one of the front and right roller assemblies as the front and right fabric panels are raised to cause the first zipper to separate above the first zipper pull allowing the front and right fabric panels to separately wind on a respective roller assembly and lowered to cause the first zipper to zip below the zipper pull to connect the front and right fabric panels along the first zipper; and
a second zipper coupled between the front fabric panel and the left fabric panel, a first end of the second zipper being fixedly coupled together to prevent separation of the second zipper at the first end and having a zipper pull configured to be held relative to one of the front and left roller assemblies as the front and left fabric panels are raised to cause the second zipper to separate above the second zipper pull allowing the front and left fabric panels to separately wind on a respective roller assembly and lowered to cause the second zipper to zip below the zipper pull to connect the front and left fabric panels along the second zipper.

12. The screen assembly of claim 11, further comprising at least one motor coupled to at least one of the front, right and left roller assemblies for substantially simultaneously raising and lowering the front, right and left fabric panels.

13. The screen assembly of claim 12, further comprising a first gear assembly coupled between the front roller assembly and the right roller assembly and a second gear assembly coupled between the front roller assembly and the left roller assembly to cause the front, right and left roller assemblies to rotate in unison, the at least one motor coupled to at least one of the first and second gear assemblies.

14. The screen assembly of claim 11, wherein the right and left fabric panels are comprised of a netting material.

15. The screen assembly of claim 11, further comprising a lower frame assembly comprised of a front elongate member coupled to a lower end of the front fabric panel, a right elongate member coupled to a lower end of the right fabric panel and a left elongate member coupled to a rawer end of the left fabric panel, the front, right and left elongate members having adjacent ends that are fixedly coupled to one another.

16. The screen assembly of claim 15, wherein the lower frame assembly is configured to weight the lower ends of the front, right and left fabric panels.

17. The screen assembly of claim 16, wherein the front, right and left fabric panels are each provided with a lower pocket for receiving a respective elongate member of the lower frame assembly.

18. The screen assembly of claim 11, wherein the first, second and third fabric panels form a generally rectangular golf ball hitting bay and the front fabric panel comprises an impact screen.

19. The screen assembly of claim 11, wherein the front screen is comprised of a backing panel and a front panel attached to the backing panel, the front panel forming a projection screen surface and the backing panel forming a black mask around at least a portion of the front panel.

20. The screen assembly of claim 19, wherein the front panel is formed from an open weave material and the backing panel extends behind the entire front panel to add strength and increase an image contrast of the front panel.

* * * * *